US012583322B2

(12) United States Patent
Ahn et al.

(10) Patent No.: US 12,583,322 B2
(45) Date of Patent: Mar. 24, 2026

(54) CONSOLE DISPLAY MOUNTING APPARATUS AND CONSOLE DISPLAY SYSTEM USING THE SAME

(71) Applicant: HYUNDAI MOBIS CO., LTD., Seoul (KR)

(72) Inventors: Sung Joon Ahn, Seoul (KR); Myung Bin Choi, Seoul (KR); Hyun Jun An, Gunpo-si (KR); Kyung Hoon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 625 days.

(21) Appl. No.: 18/082,098

(22) Filed: Dec. 15, 2022

(65) Prior Publication Data

US 2023/0249550 A1 Aug. 10, 2023

(30) Foreign Application Priority Data

Feb. 10, 2022 (KR) ........................ 10-2022-0017535

(51) Int. Cl.
| | |
|---|---|
| *B60K 35/00* | (2024.01) |
| *B60K 35/10* | (2024.01) |
| *B60K 35/215* | (2024.01) |
| *B60K 35/23* | (2024.01) |
| *B60K 35/28* | (2024.01) |
| *B60K 35/60* | (2024.01) |
| *B60K 37/20* | (2024.01) |
| *B60K 35/22* | (2024.01) |

(52) U.S. Cl.
CPC .............. *B60K 35/60* (2024.01); *B60K 35/10* (2024.01); *B60K 35/215* (2024.01); *B60K 35/23* (2024.01); *B60K 35/28* (2024.01); *B60K 37/20* (2024.01); *B60K 35/22* (2024.01); *B60K 2360/48* (2024.01); *B60K 2360/774* (2024.01); *B60K 2360/816* (2024.01)

(58) Field of Classification Search
CPC ...... B60K 35/215; B60K 35/28; B60K 35/23; B60K 35/10; B60K 35/60; B60K 37/20; B60K 35/22; B60K 2360/816; B60K 2360/48; B60K 2360/774
See application file for complete search history.

(56) References Cited

U.S. PATENT DOCUMENTS

| | | | | |
|---|---|---|---|---|
| 5,847,685 | A * | 12/1998 | Otsuki ................... | B60K 35/50 |
| | | | | 248/920 |
| 2006/0050018 | A1* | 3/2006 | Hutzel ...................... | B60R 1/12 |
| | | | | 345/60 |
| 2018/0011551 | A1* | 1/2018 | Gothlin .................. | B60K 35/60 |
| 2022/0317767 | A1* | 10/2022 | Zhang ................... | B60K 35/22 |
| 2024/0359557 | A1* | 10/2024 | Wall ................... | B60R 11/0235 |

* cited by examiner

*Primary Examiner* — Steven O Douglas
(74) *Attorney, Agent, or Firm* — NSIP Law

(57) ABSTRACT

An apparatus for mounting a console display disposed in a vehicle includes a display holder unit coupled to the console display, a motor unit configured to rotate the display holder unit, and a mounting bracket including the display holder unit and the motor unit installed therein.

13 Claims, 12 Drawing Sheets

Console display

Mounting device

Openness sense in slim shape + providing driving convenience (a) Driving mode

Column receiving + monitor moving + seat connection → comfort (b) Relax mode

Providing various utilization through large table (c) Office mode

Table and console display positions in driving mode

<Table inserted state>          <Initial display position>

Table and console display positions in officemode

<Table projected state>                    <Display rotation>

<Right side>                    <Left side>

Sensor pointer

Position sensor

Second link

First pointer

Second pointer

First sensing unit

Second sensing unit

<Mounted state>　　　<Detachable state>

Display holder

Link shaft    First link

Display cover recess

Flange structure

<Cross-section of display mounting part>          <Cross-section of display detaching part>

Display cover recess                    Seat portion side protrusion

CONSOLE DISPLAY MOUNTING APPARATUS AND CONSOLE DISPLAY SYSTEM USING THE SAME

This application claims the benefit under 35 U.S.C. § 119(a) of Korean Patent Application No. 10-2022-0017535, filed on Feb. 10, 2022, the entire disclosure of which is hereby incorporated by reference for all purposes.

BACKGROUND

Field

The present embodiments are applicable to vehicles in all fields, and more specifically, for example, to a vehicle supporting autonomous driving.

Description of the Related Art

Research on autonomous driving that allows a vehicle to move without user intervention is being conducted. Autonomous driving devices are mainly classified into five generations. Recently, research has been conducted on 3rd generation autonomous driving devices that can change lanes due to partial autonomous driving, 4th generation autonomous driving that can handle external hazards caused by semi-autonomous driving environments, and 5th generation autonomous driving devices that can perform autonomous driving on all routes without user intervention.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided an apparatus for mounting a console display disposed in a vehicle, the apparatus including a display holder unit coupled to the console display, a motor unit configured to rotate the display holder unit, and a mounting bracket including the display holder unit and the motor unit installed therein.

The display holder unit may include a display holder including a flange structure coupled to the console display, a first link configured to fix the display holder to the mounting bracket, and a rotation shaft configured to rotate the display holder.

The may also include a display cover recess coupled to the display holder, wherein the display holder may include a seat portion side protrusion configured to externally protrude so as to be coupled to the display cover recess.

The motor unit may include a rotation motor configured to rotate, a sensor pointer configured to rotate in response to a rotation of the rotation motor, a position sensor configured to sense a motion of the sensor pointer, and a second link configured to fix the rotation motor, the sensor pointer, and the position sensor to the mounting bracket.

The sensor pointer may include a first pointer and a second pointer, the first pointer and the second pointer each being configured to rotate in response to an operation of the rotation motor.

The position sensor may include a first sensing unit configured to sense the first pointer of the sensor pointer and a second sensing unit configured to sense the second pointer of the sensor pointer.

In another general aspect, here is provided a console display system including the above described console display mounting apparatus, the console display system may include a console display mounting apparatus configured to mount a console display at a center of a front seat of a vehicle, and the console display mounting apparatus is configured to attach/detach the console display to/from the console display mounting apparatus by rotating the console display based on a changing of a boarding mode of the vehicle. The console display mounting apparatus is further configured to fix the console display thereto based on mounting the console display thereon.

The boarding mode of the vehicle may include a driving mode and an office mode.

The console display mounting apparatus may be configured to rotate based on the changing the boarding mode of the vehicle from the driving mode into the office mode.

When the boarding mode is the office mode, the console display mounting apparatus may be configured to take out a table provided within a cockpit of the vehicle and to rotate the console display of the vehicle in a driver direction within the console display mounting apparatus.

When the second sensing unit of the position sensor senses the second pointer of the sensor pointer, the console display mounting apparatus may determine the console display is in a detachable state.

When the boarding mode is the driving mode, a table provided within a cockpit of the vehicle may be inserted and the console display of the vehicle is mounted in a manner of being tilted in a table direction within the console display mounting apparatus.

When the first sensing unit of the position sensor senses the first pointer of the sensor pointer, the console display mounting apparatus may determine that the console display in a mountable position.

In another general aspect, here is provided a vehicle including a console display disposed within the vehicle, a console display mounting device configured to mount the console display thereon, a driving system configured to change a boarding mode of the vehicle, and a console display system configured to attach/detach the console display to/from the console display mounting device by rotating the console display disposed within the console display mounting device based on a changing of the boarding mode of the vehicle.

Figure 1:
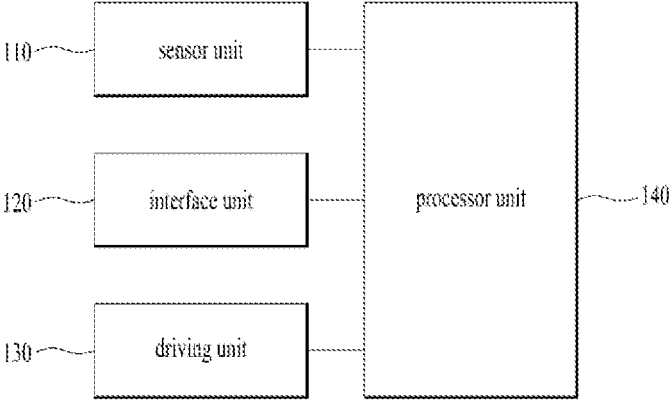
FIG. 1 illustrates a schematic configuration of a vehicle driving system according to embodiments of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

In addition, 'vehicle' used in the following description is assumed to be a vehicle used for transporting occupants, but is not limited thereto, and may include all Urban Air Mobility (UAM), buses, etc.

FIG. 1 illustrates a schematic configuration of a vehicle driving system according to embodiments of the present disclosure.

According to embodiments of the present disclosure, a vehicle may include a sensor unit 110, an interface unit 120, a driving unit 130, and a processor unit 140.

The sensor unit 110 may include at least one sensor capable of recognizing the internal and/or external states of the vehicle. The sensor unit 110 may include, for example, a camera sensor, an infrared sensor, a radar sensor, a voice sensor, a temperature sensor, a humidity sensor, and the like.

The interface unit 120 may include at least one interface that provides various audio-visual data or information related to or unrelated to the vehicle to a user of the vehicle and/or a control tool for the vehicle or its component(s). The interface unit 120 may include, for example, a console display(s) provided to an occupant(s), and/or a sound device(s) provided to an occupant(s), etc. The interface unit 120 may exchange signals with at least one electronic device in the vehicle in a wired or wireless manner. The interface unit 120 may convert an input by a user of the vehicle into an electrical signal and provide the electrical signal to the processor unit 140.

The driving unit 130 drives or may drive and/or drive components inside or outside the vehicle physically based on the control of the processor unit 140. The driving unit 130 may change, for example, physical position(s) of the wheel(s), the steering wheel, the seat(s), and the console display(s) of the vehicle.

The processor unit 140 may include at least one processor. The at least one processor in the processor unit 140 may be electrically connected to the vehicle components (e.g., sensor unit, interface unit, communication unit (not shown)) to exchange signals, and may control the components of the vehicle. The processor unit 140 may further include at least one memory (not shown). The at least one processor may be referred to as a controller, a microcontroller, a microprocessor, or a microcomputer. The at least one processor may be implemented by hardware, firmware, software, or a combination thereof. For example, at least one Application Specific Integrated Circuit (ASIC), at least one Digital Signal Processor (DSP), at least one Digital Signal Processing Device (DSPD), at least one Programmable Logic Device (PLD), or at least one Field Programmable Gate Arrays (FPGA) may be included in the above at least one processor. The functions, procedures, proposals, and/or methods disclosed herein may be implemented using firmware or software, and the firmware or software may be implemented to include modules, procedures, functions, and the like. Firmware or software configured to perform the functions, procedures, suggestions, and/or methods disclosed herein may be included in at least one processor, or may be stored in at least one memory and driven by at least one processor. The functions, procedures, proposals, and/or methods disclosed herein may be implemented in the form of codes, instructions, and/or a set of instructions using firmware or software.

The processor unit 140 may generate control signals for the sensor unit 110, the interface unit 120, and/or the driving unit 130 based on electrical signals received from the sensor unit 110 and/or the interface unit 120.

The at least one memory may be connected to at least one processor, and may store various information related to operations of the at least one processor. For example, the at least one memory may store software code that includes instructions for performing some or all of the processes controlled by the at least one processor, or for performing the procedures and/or methods described/proposed below. The at least one memory may store commands, instructions, or programs. When the commands, instructions, or programs are executed, they may enable at least one processor operably connected to the at least one memory to perform operations according to embodiments of the present disclosure.

The vehicle may further include a communication unit. The communication unit may include one or more transceivers, and may receive user data, control information, wireless signal/channel, etc. mentioned in functions, procedures, proposals, methods, operation flowcharts, and/or the like, which are disclosed in the present specification, from one or more other devices. For example, the one or more transceivers may be connected to the processor unit 140 and may transmit and/or receive wireless signals. For example, at least one processor in the processor unit 140 may control the one or more transceivers to transmit user data, control information, or wireless signals to at least one other device. In addition, the processor unit 140 may control the one or more transceivers to receive user data, control information, or wireless signals from one or more other devices. In addition, the one or more transceivers may be connected to one or more antennas, and the one or more transceivers may be configured to transmit and/or receive user data, control information, wireless signals/channels, and the like with other device(s) through one or more antennas.

Figure 2:
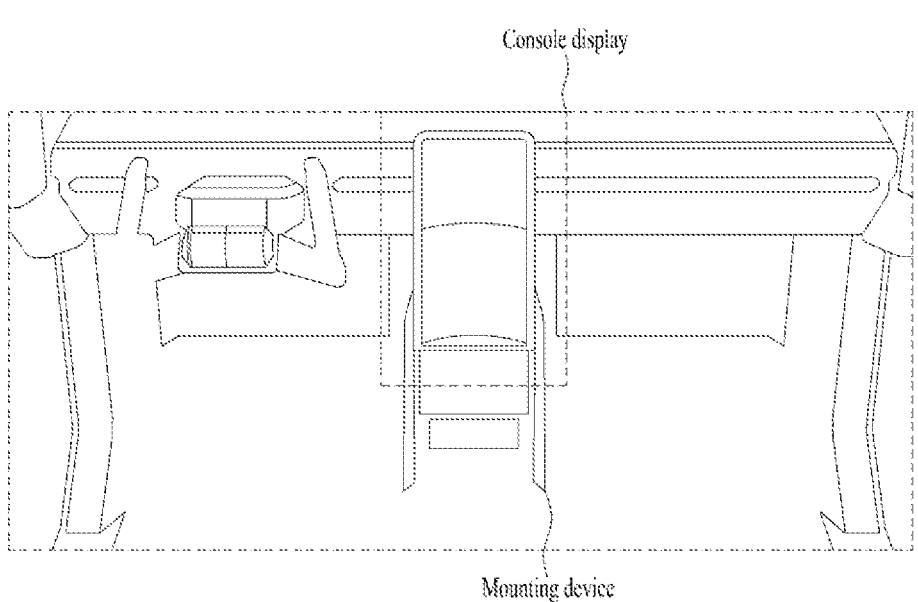
FIG. 2 is a diagram to describe an internal configuration of a mobile vehicle according to an embodiment of the present disclosure.

FIG. 2 is a diagram to describe an internal configuration of a mobile vehicle according to an embodiment of the present disclosure.

First, a vehicle according to an embodiment shown in FIG. 2 may include at least one camera capable of detecting a state in the vehicle, a Head-Up Display (HUD), a front console display(s) providing audio-visual information to occupant(s), and a console display providing state information of the vehicle to an occupant and/or control over the vehicle's gear, air conditioning, and/or seat (s). The vehicle also includes a steering wheel, a seat(s), and a lighting(s).

The console display according to an embodiment of the present disclosure may be disposed in a mounting device located in a center fascia of a console. The console display according to the embodiment of the present disclosure may be disposed on one side of a driver's seat or in a space between the driver's seat and a passenger seat when the passenger seat is provided. The console display may be attached to or detached from a mounting device according to a boarding mode.

In addition, the console display according to the present embodiment may provide a manipulator necessary for vehicle driving and an indicator or an office screen depending on a user's status.

For example, when the vehicle is autonomously driving, the console display may be attached to or detached from the mounting device.

The indicator or the office screen may be outputted to the console display based on the state of the console display detached/attached from/to the mounting device.

The mounting device according to the embodiment of the present disclosure may be integrally mounted on the console of the vehicle, but is not limited thereto and may be variously installed at a position where the console display can be controlled in the vehicle.

Figure 3:
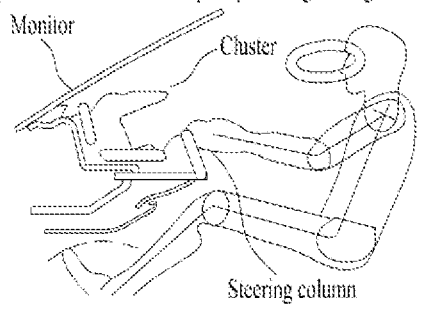
FIG. 3 illustrates example of modes provided by a vehicle to an occupant and the states of the internal components of the vehicle with respect to the corresponding modes according to embodiments of the present disclosure.
Figure 3:
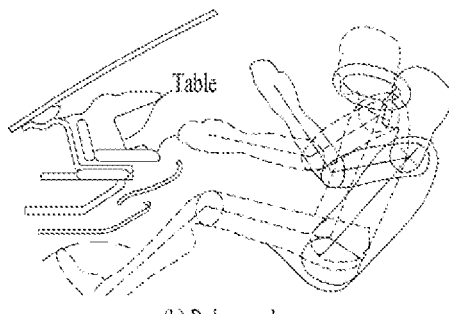
Figure 3:
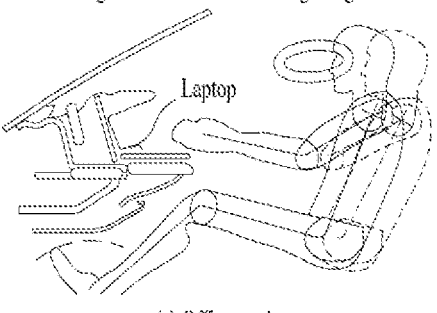

FIG. 3 illustrates example of modes provided by a vehicle to an occupant and the states of the internal components of the vehicle with respect to the corresponding modes according to embodiments of the present disclosure. Particularly, FIG. 3 (*a*) illustrates a driving mode, FIG. 3 (*b*) illustrates a relax mode, and FIG. 3 (*c*) illustrates an office mode.

In embodiments of the present disclosure, the vehicle may be a vehicle capable of manual driving and autonomous driving as a vehicle of level 4 or higher. In the present specification, the vehicle being driven is capable of manual driving or autonomous driving.

In the embodiments of the present disclosure, a vehicle being driven autonomously may provide an occupant (particularly, a driver) with various modes (e.g., relax mode, office mode) according to the needs of the occupant.

The relax mode and the office mode according to the embodiments of the present disclosure may be provided to a user when the vehicle is being autonomously driven. In the present specification, for convenience of description, a mode other than the relax mode and the office mode among modes provided by a currently driven vehicle to a user is referred to as a driving mode. From the viewpoint of the driving mode, a mode of a vehicle according to embodiments of the present disclosure may be divided into manual driving and autonomous driving. Meanwhile, vehicle modes of a vehicle according to embodiments of the present disclosure may include a driving mode, a relax mode, and an office mode from the viewpoint of a user in an autonomously driven vehicle.

A driving mode of a vehicle may be changed from manual driving to autonomous driving, and vice versa, by the selection of a driver of the vehicle. In the case of a vehicle in which an occupant can board as well as a driver, a User Interface (UI) capable of changing the mode(s) only at a driver position (e.g., a steering wheel position) may be provided to prevent the occupant other than the driver from changing the modes provided by the vehicle in embodiments of the present disclosure. Alternatively, even if a UI for selecting modes is provided between the driver and the occupant, the vehicle or at least one processor of the vehicle may be configured to determine that only the mode change by the driver is an effective mode change based on the sensing by a sensor (e.g., a camera sensor).

FIG. 3 illustrates positions of a steering wheel, a front console display, a table, and a seat, which are changed in response to modes provided by a vehicle to an occupant according to embodiments of the present disclosure.

Referring to FIG. 3 (*a*), in a driving mode, a vehicle may provide a slim-shaped cockpit to provide a sense of openness and convenience of driving to a driver.

Referring to FIG. 3 (*b*), in a relax mode, a column(s) arranged in front of an occupant may be accommodated in a cockpit or a table bottom end and the seat may be tilted to enable the occupant to lie down, thereby providing comfort to the occupant. According to embodiments, in the relax mode, the position of the console display located in front of the occupant may also be moved downward in comparison to the position in the driving mode or the office mode so as to provide a wider space for the occupant or not to block the occupant's view.

Referring to FIG. 3 (c), a large table may be provided to an occupant in an office mode. Personal items of the occupant may be placed on the table.

Figure 4:
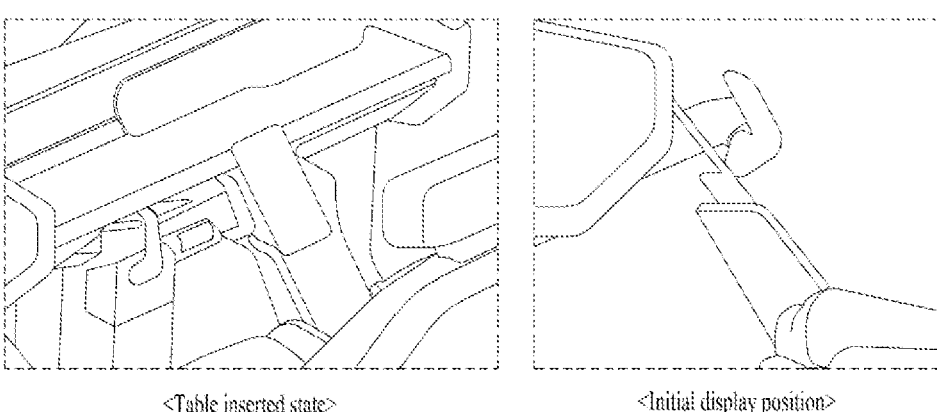
FIG. 4 and FIG. 5 are diagrams to describe operations of a table and console display mounting device according to a boarding mode according to an embodiment of the present disclosure.
Figure 5:
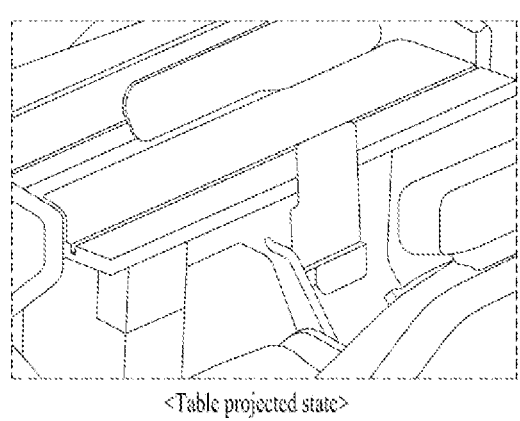
Figure 5:
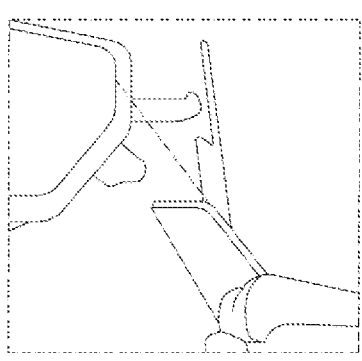

FIG. 4 and FIG. 5 are diagrams to describe operations of a table and console display mounting device according to a boarding mode according to an embodiment of the present disclosure.

Referring to FIG. 4 and FIG. 5, a console display system includes a console display mounting device that holds a console display in the center of the vehicle's front seat. The console display mounting device is configured to rotate the console display if a boarding mode of the vehicle is changed, whereby the console display may be attached to or detached from the console display mounting device. Once the console display is mounted, the console display mounting device is configured to fix the console display thereto. In this case, the boarding mode of the vehicle includes a driving mode and an office mode, and the console display mounting device operates in response to the boarding mode.

Referring to FIG. 4, when the boarding mode is the driving mode, the vehicle is in a table inserted state. And, the console display in an initial state of the driving mode may be disposed in the mounting device.

That is, if the vehicle's boarding mode is driving in the driving mode, a table provided inside the vehicle's cockpit may be inserted and the vehicle's console display may be mounted in a manner of being tilted in the table direction within the mounting device.

Referring to FIG. 5, the display mounting apparatus may be configured to rotate when the boarding mode of the vehicle is changed from the driving mode to the office mode.

When the vehicle is in the office mode, the table is in a projected state and the console display may be rotated toward a driver side by the console display mounting device of the mounting device. Therefore, a mounting space of the console display is formed between the mounting device and the table, and the lower end of the console display may be supported to be fixed.

That is, when the boarding mode is the office mode, the table provided inside the vehicle's cockpit may be taken out and the vehicle's console display may be configured to rotate in the driver's direction within the mounting device.

FIGS. 6 to 12 are diagrams to describe a console display mounting device according to an embodiment of the present invention.

Figure 6:
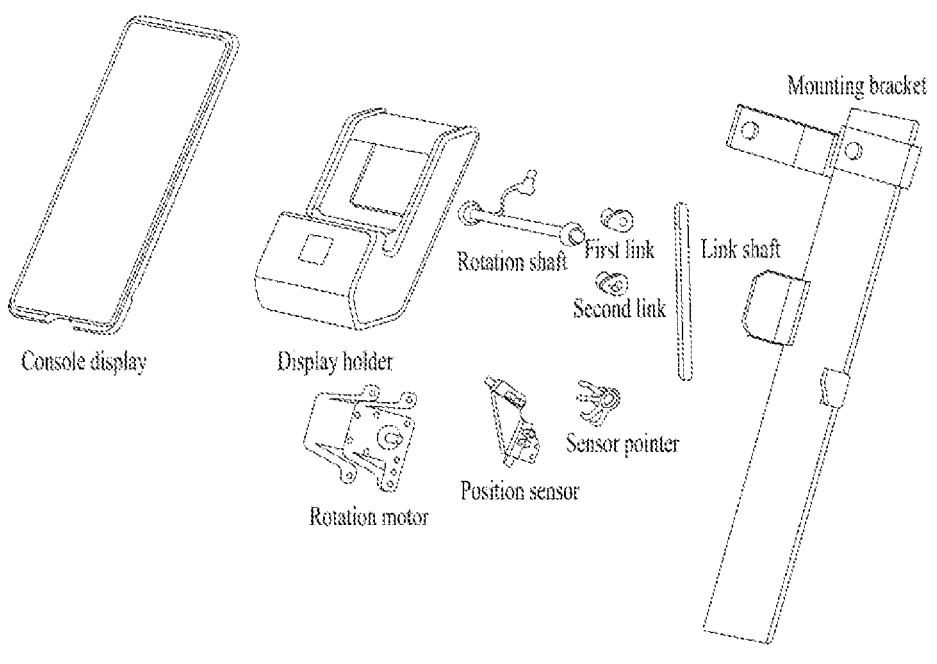
FIGS. 6 to 12 are diagrams to describe a console display mounting device according to an embodiment of the present invention.

Referring to FIG. 6, a console display mounting device according to an embodiment of the present disclosure may include a display holder unit coupled to a console display to rotate, a motor unit rotating the display holder unit, and a mounting bracket having the motor unit and the display holder unit installed therein.

The display holder unit may include a display holder including a flange structure coupled to the console display, a first link fixing the display holder to the mounting bracket, and a rotation shaft rotating the display holder. That is, the display holder may be configured to be coupled to the mounting bracket using the rotation shaft and the first link.

The motor unit may include a rotation motor, a sensor pointer that rotates in response to rotation, a position sensor that senses movement of the sensor pointer, and a second link fixing the rotation motor, the sensor pointer, and the position sensor to the mounting bracket. That is, the rotation motor may be configured to be coupled to the mounting bracket using the position sensor, the sensor point, and the second link.

The mounting bracket may be configured to couple the display holder 32 for holding the lower end of the console display and the rotation motor for rotating the console display holder.

Figure 7:
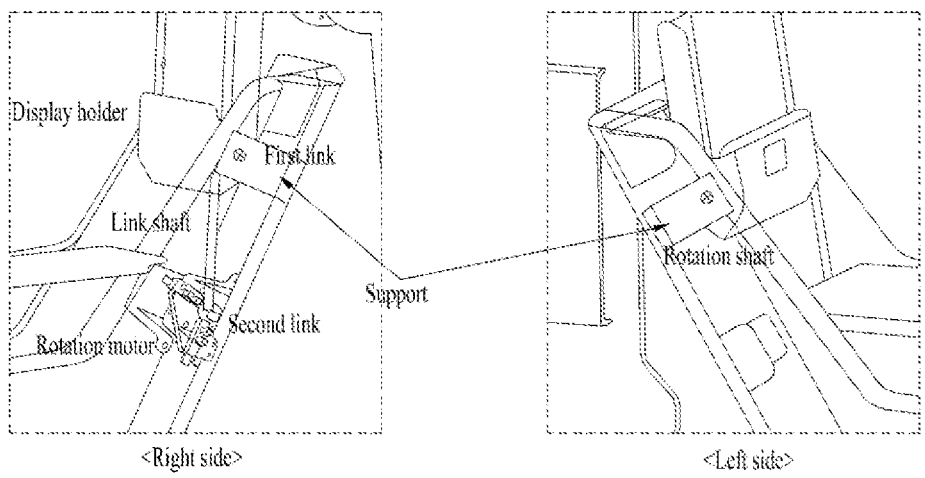
Figure 8:
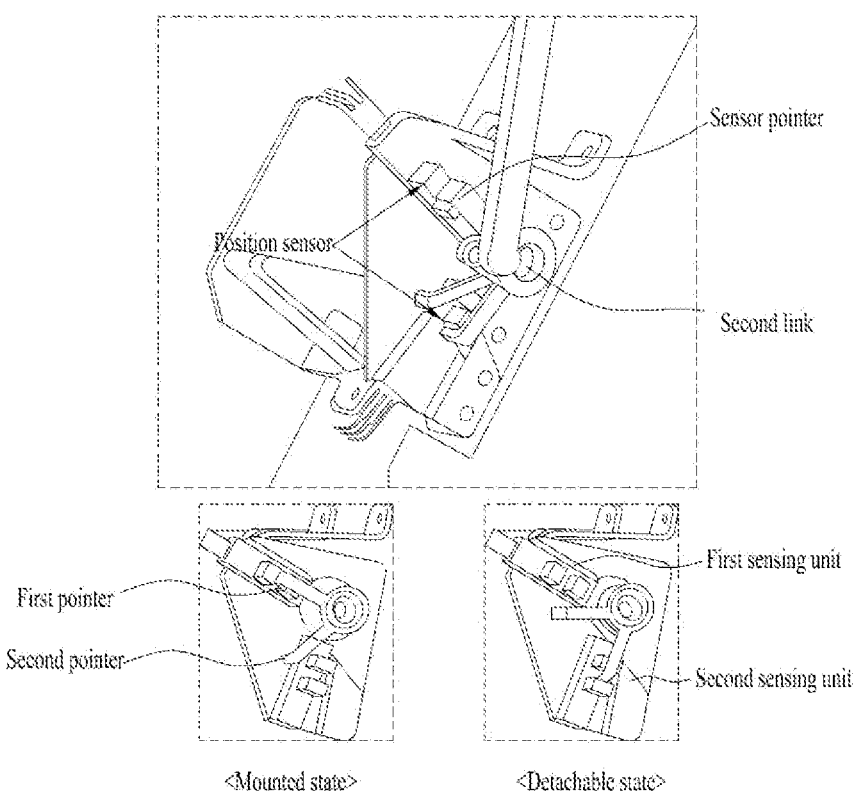
Figure 9:
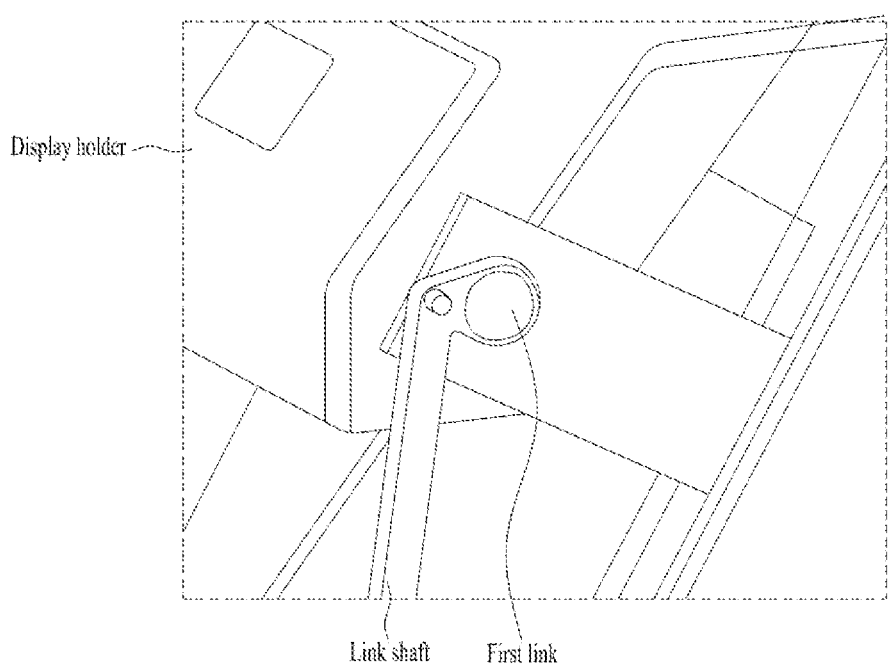

FIGS. 7 to 9 are perspective diagram of a console display mounting device according to an embodiment of the present disclosure.

FIG. 7 is a perspective diagram illustrating a right side and a left side of a console display mounting device. FIG. 8 is a diagram illustrating a motor unit of a console display mounting device, and FIG. 9 is a diagram illustrating a display holder unit of a console di splay mounting device.

Referring to FIGS. 7 to. 9, a display holder may be coupled to an upper end portion of a mounting bracket by a display holder, a first link and a rotation shaft. In this case, the mounting bracket may include a support formed to have a preset length to secure a rotation space of the display holder. The support may include left and right supports for coupling to left and right sides of the display holder, respectively. The left support may be coupled to the display holder through the rotation shaft, and the right support may be coupled thereto by the first link.

In this case, as the first link is connected to one end portion of a link shaft so as to be connected to the display holder, and a second link is connected to the other end portion of the link shaft so as to be connected to a rotation motor.

Referring to FIG. 9, the display holder may be connected to the lower end portion of the mounting bracket by the rotation motor and the second link. Namely, the mounting bracket may include the second link coupled to the rotation shaft of the rotation motor, the sensor point fixed to one end portion of the second link, and the position sensor assembled to enter/exit the sensor pointer.

The sensor pointer and the second link rotate together according to the operation of the rotation motor. The sensor pointer includes a first pointer and a second pointer, and the sensor pointer is connected to the second link and rotates. The position sensor may include a first sensing unit and a second sensing unit for sensing rotation of the sensor pointer. Accordingly, the sensor point rotates according to the operation of the rotating motor, and the first sensing unit of the position sensor may detect the first pointer or the second sensing unit may detect the second pointer.

For example, if the first sensing unit of the position sensor detects the first pointer of the sensor pointer by the rotational motion of the sensor pointer, it may indicate a console display mounted state.

For example, if the second sensing unit of the position sensor detects the second pointer of the sensor pointer by the rotational motion of the sensor pointer, it may indicate a console display detachable state.

Figure 10:
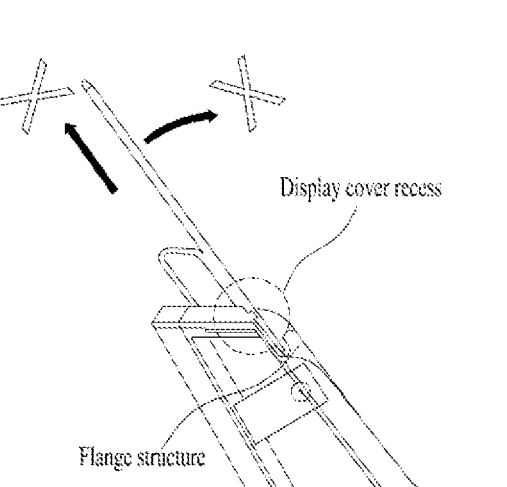
Figure 10:
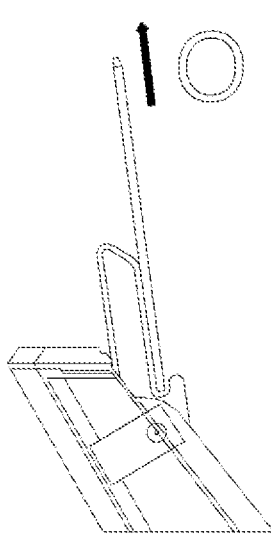
Figure 11:
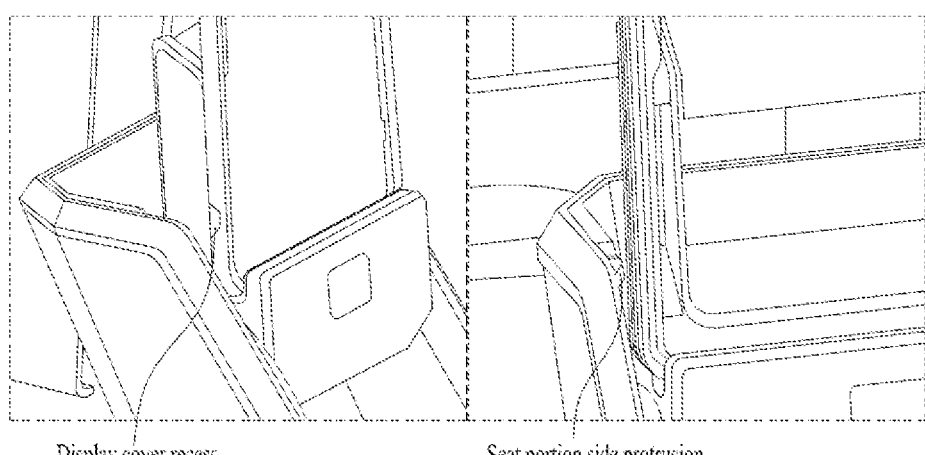
Figure 12:
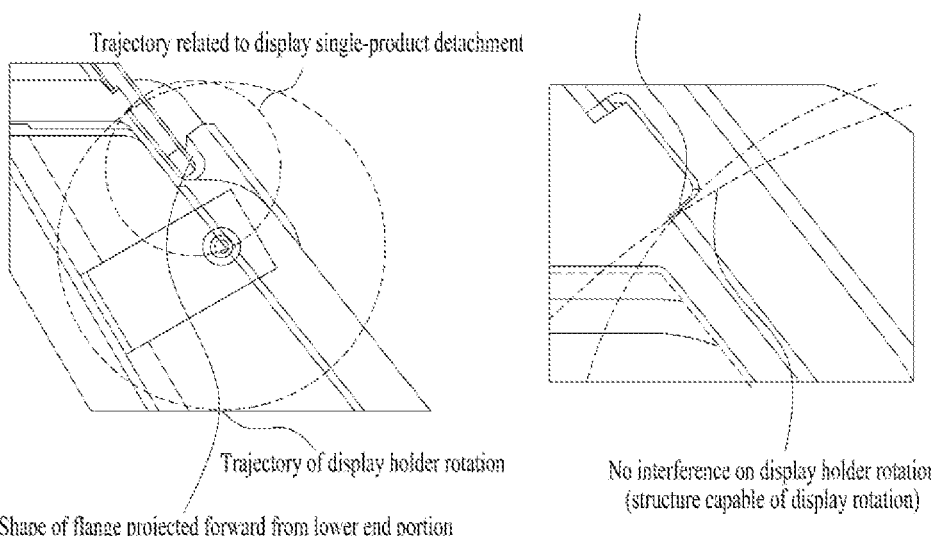

FIG. 10 shows cross-sections of a display mounting part and a display detaching part according to an embodiment of the present disclosure, FIG. 11 shows a display cover recess and a seat portion protrusion according to an embodiment of the present disclosure, and FIG. 12 is a diagram to describe the combination of the coupling between the display cover recess and the seat portion protrusion.

Referring to FIG. 10 and FIG. 12, a console display mounting device may include a seat portion side protrusion and a display holder may include a cover recess.

When a console display is disposed on the display holder, the seat portion side protrusion and the display cover recess are coupled, thereby preventing the console display from being detached externally by the rotation of the display holder.

A lower end portion of the display holder may have a flange structure that protrudes forward. When the console display is fitted into the flange structure, the flange structure plays a role in supporting the lower end of the console display not to move. Namely, while the console display is mounted on the display holder, if a trajectory of display holder rotation is greater than a trajectory related to console display single-product detachment, the display holder is stably supported by the flange structure capable of supporting a rounded end portion of the console display and the detachment due to the rotation may be prevented by limiting a rotation angle of the console display. The flange structure may be modified in various ways without limitation as long as it supports the lower end of the console display to be fixed so that the console display is not detached.

On the other hand, in the event of an attempt to forcibly detach the console display single-product, interference between the display cover recess and the flange structure may occur, thereby preventing the console display from being detached externally. In addition, when the display holder rotates, there occurs no interference, so the display holder rotates and stands up. Accordingly, the console display may be detachable as the display cover recess escapes from the protrusion.

Therefore, as the seat portion side protrusion is fitted into the display cover recess, the console display mounting device may prevent the console display from being detached externally during the driving mode. In the office mode, as the display holder stands up through rotation and the display cover recess escapes from the protrusion, the console display mounting device may enter a detachable state.

In another aspect of the present disclosure, the above-described proposal or operation of the present disclosure may be provided as codes that may be implemented, embodied or executed by a "computer" (a comprehensive concept including a system on chip (SoC) or a microprocessor), an application storing or containing the codes, a computer-readable storage medium, a computer program product, and the like, which also comes within the scope of the present disclosure.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for mounting a console display disposed in a vehicle, the apparatus comprising:
   a display holder unit coupled to the console display;
   a motor unit configured to rotate the display holder unit; and
   a mounting bracket comprising the display holder unit and the motor unit installed therein,
   wherein the display holder unit comprises:
   a display holder including a flange structure coupled to the console display;
   a first link configured to fix the display holder to the mounting bracket; and
   a rotation shaft configured to rotate the display holder.

2. The apparatus of claim 1, further comprising a display cover recess coupled to the display holder, wherein the display holder comprises a seat portion side protrusion configured to externally protrude so as to be coupled to the display cover recess.

3. The apparatus of claim 2, the motor unit comprising:
   a rotation motor configured to rotate;
   a sensor pointer configured to rotate in response to a rotation of the rotation motor;
   a position sensor configured to sense a motion of the sensor pointer; and
   a second link configured to fix the rotation motor, the sensor pointer, and the position sensor to the mounting bracket.

4. The apparatus of claim 3, wherein the sensor pointer comprises a first pointer and a second pointer, the first pointer and the second pointer each being configured to rotate in response to an operation of the rotation motor.

5. The apparatus of claim 4, wherein the position sensor comprises:
   a first sensing unit configured to sense the first pointer of the sensor pointer; and
   a second sensing unit configured to sense the second pointer of the sensor pointer.

6. A console display system comprising the console display mounting apparatus of claim 5, the console display system comprising a console display mounting apparatus configured to mount a console display at a center of a front seat of a vehicle,
   wherein the console display mounting apparatus is configured to attach/detach the console display to/from the console display mounting apparatus by rotating the console display based on a changing of a boarding mode of the vehicle and
   wherein the console display mounting apparatus is further configured to fix the console display thereto based on mounting the console display thereon.

7. The console display system of claim 6, wherein the boarding mode of the vehicle includes a driving mode and an office mode.

8. The console display system of claim 7, wherein the console display mounting apparatus is configured to rotate based on the changing the boarding mode of the vehicle from the driving mode into the office mode.

9. The console display system of claim 8, wherein, when the boarding mode is the office mode, the console display mounting apparatus is configured to take out a table provided within a cockpit of the vehicle and to rotate the console display of the vehicle in a driver direction within the console display mounting apparatus.

10. The console display system of claim 9, wherein, when the second sensing unit of the position sensor senses the second pointer of the sensor pointer, the console display mounting apparatus determines the console display is in a detachable state.

11. The console display system of claim 8, wherein, when the boarding mode is the driving mode, a table provided within a cockpit of the vehicle is inserted and the console display of the vehicle is mounted in a manner of being tilted in a table direction within the console display mounting apparatus.

12. The console display system of claim 11, wherein, when the first sensing unit of the position sensor senses the first pointer of the sensor pointer, the console display mounting apparatus determines that the console display in a mountable position.

13. A vehicle, comprising:

a console display disposed within the vehicle and a display holder unit coupled to the console display;

a console display mounting device configured to mount the console display thereon;

a driving system configured to change a boarding mode of the vehicle; and a console display system configured to attach/detach the console display to/from the console display mounting device by rotating the console display disposed within the console display mounting device based on a changing of the boarding mode of the vehicle, wherein the display holder unit comprises:

a display holder including a flange structure coupled to the console display;

a first link configured to fix the display holder to the console display mounting device; and a rotation shaft configured to rotate the display holder.

* * * * *